H. J. PHILLIPS.
TIRE TOOL.
APPLICATION FILED JUNE 24, 1908.

934,461.

Patented Sept. 21, 1909.

Witnesses
J. P. Britt
E. C. Duffy

Inventor
Herbert John Phillips,
By O. C. Duffy & Son
Attorneys

UNITED STATES PATENT OFFICE.

HERBERT JOHN PHILLIPS, OF BAYSWATER, LONDON, ENGLAND.

TIRE-TOOL.

934,461.   Specification of Letters Patent.   Patented Sept. 21, 1909.

Application filed June 24, 1908. Serial No. 440,172.

*To all whom it may concern:*

Be it known that I, HERBERT JOHN PHILLIPS, a subject of the King of Great Britain and Ireland, residing at Bayswater, in the county of London, England, have invented a new or Improved Tire-Tool, of which the following is a specification.

In removing and replacing the covers of pneumatic tires of wheel rims with the usual tools great difficulty is encountered owing to the necessity of holding in position the tools, which are usually in the form of levers, during the operation, and the object of this invention is to provide a tool which will be automatically held in place when engaged with the bead of a tire cover in the wheel rim, thereby freeing the hands of the operator to manipulate a second tool.

Figure 1:
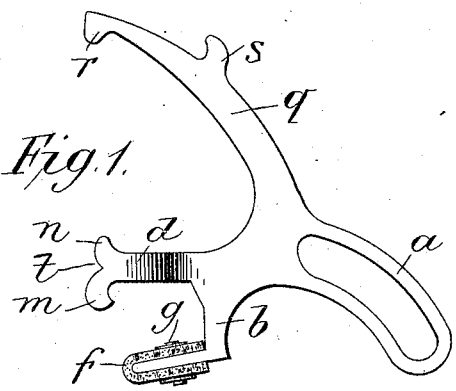
Figure 2:
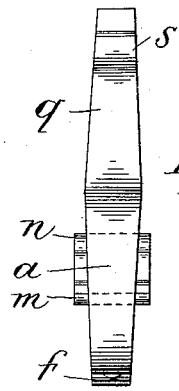
Figure 3:
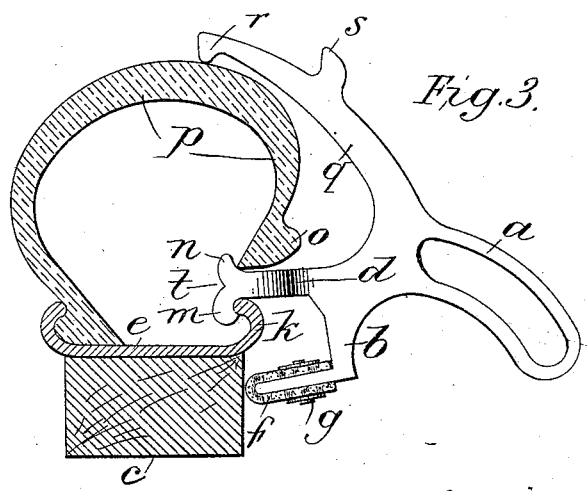
Figure 4:
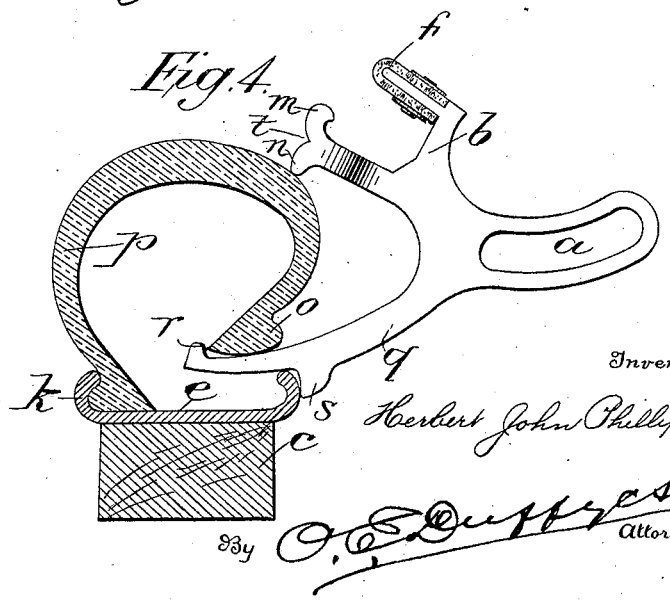

Figures 1 and 2 of the accompanying drawings illustrate in side elevation, and end elevation respectively a tool according to this invention. Figs. 3 and 4 are views showing the tool in different positions for use.

The tool comprises a handle or stock portion $a$ which may resemble in shape the butt of a pistol, from which extend three branches forming a double fork, the lower branch $b$ of which extends downwardly and then forwardly at right angles, the end of the forwardly extending portion being adapted to bear against the side of the wheel felly $c$ when the intermediate branch $d$, which extends forwardly, is pushed over the edge of the wheel rim $e$ as shown in Fig. 3. The lower branch $b$ may be covered with material such as leather to prevent damage to the wheel felly; for example a strip of leather $f$ may be bent to U shape over the end of the branch and secured by a rivet $g$ passing therethrough. The intermediate branch is formed at its end with a kind of double hook, one part $m$ of which extends downwardly toward the lower branch $b$, and is adapted to engage with the inwardly turned edge $k$ of the wheel rim $e$, Fig. 3, and the other $n$ of which extends upwardly and is adapted to engage the bead $o$ of the tire cover $p$ when the latter is forced or levered up over it by means of a flat bar or the like pushed beneath the bead of the cover and fulcrumed on the wheel rim. As will be understood, when the bead of the cover $p$ is thus engaged by the upwardly extending hook $n$ of the intermediate branch $d$, the cover, owing to its tendency to resume its normal position in the wheel rim, will tend to tilt the tool on the edge of the wheel rim $e$, but this movement is prevented by the upper branch $q$ of the tool, which is suitably curved and preferably formed with a downwardly extending projection or hook $r$, bearing upon the tread portion of the cover $p$, Fig. 3, and thus preventing further tilting movement. The tool can then be released without risk of the bead $o$ of the outer cover becoming disengaged from it, so that the operator can employ both hands to manipulate a second tool which is to be applied at a different part of the outer cover. When both tools have been properly engaged, the cover can be readily freed from the rim in the usual manner.

In some cases, as in the example illustrated, the upper branch $q$ may be formed at its outer or rearward side with a projection $s$ formed with a forward face that is curved to correspond with the outer surface of the edge of the wheel rim with which it engages; the upper branch can then be used to lift the bead $o$ of the outer cover if the same be fairly loose from the wheel rim after the manner of an ordinary lever, see Fig. 4.

The outer end of the intermediate branch is formed between its two hook-like portions $m$, $n$ with a recess $t$ which, when replacing a tire cover, is adapted to engage with the outer part of the bead $o$ thereof, and hold it in the rim while another portion of the bead is being worked into the wheel rim by another tool.

What I claim is:—

1. A tire tool comprising a handle portion, two outer rigid branches extending therefrom and adapted to respectively bear against the side of a wheel felly and to extend over the tread of a tire on such felly and a rigid intermediate branch formed with means adapted to engage within the edge of the rim and with means adapted to engage within the corresponding bead of the tire cover, as set forth.

2. A tire tool comprising a handle portion, an angle-shaped arm extending therefrom, protective material covering the outer end of said arm, a curved arm extending from said handle portion and a rigid hooked intermediate arm extending from said handle portion, as set forth.

3. A tire tool comprising a handle portion from which extend an angle-shaped arm, a curved arm, and an intermediate arm the outer end of which is formed with two hooked portions, one extending toward said angle shaped arm and the other extending toward said curved arm.

4. A tire tool comprising a handle portion from which extend an angle-shaped arm, a curved arm, and an intermediate arm the outer end of which is formed with two hooked portions, one extending toward said angle shaped arm and the other extending toward said curved arm and with a recess between the two hooks.

5. A tire tool comprising a handle portion from which extend an angle shaped arm, a curved arm formed with a projection on its inner side, and an intermediate arm the outer end of which is hooked.

6. A tire tool comprising a handle portion from which extend a lower branch extending downwardly and then forwardly, a strip of leather fixed over the forward end of said lower branch, a curved upper branch formed with a downwardly extending projection on its front side and with a projection at its rear side shaped to correspond with the outer surface of the edge of the wheel rim, and an intermediate branch formed at its end with a double hook one part of which extends downwardly toward the lower branch and the other part of which extends upwardly.

Signed at London, England, this 9th day of June, 1908.

HERBERT JOHN PHILLIPS.

Witnesses:
H. D. JUMESON,
T. L. RAND.